United States Patent [19]
Kondo et al.

[11] Patent Number: 5,008,176
[45] Date of Patent: Apr. 16, 1991

[54] INFORMATION RECORDING MEDIUM HAVING A GLASS SUBSTRATE

[75] Inventors: Tetsuya Kondo, Yokohama; Noboru Kawai, Komae, both of Japan

[73] Assignee: Victor Company of Japan, Ltd., Yokohama, Japan

[21] Appl. No.: 250,391

[22] Filed: Sep. 28, 1988

[30] Foreign Application Priority Data

Sep. 29, 1987 [JP] Japan .................... 62-242528

[51] Int. Cl.$^5$ .................... G03F 7/09; G03C 1/765
[52] U.S. Cl. .................... 430/272; 430/321; 430/323; 430/325; 156/643; 156/659.1; 156/663; 428/167; 428/156; 428/64; 501/66; 501/52; 501/61; 501/62; 346/135.1; 346/134; 369/279
[58] Field of Search ............ 430/272, 321, 323, 325; 156/643, 659.1, 663; 428/167, 156, 64; 501/66, 52, 61, 62; 346/135.1, 134; 369/279

[56] References Cited

U.S. PATENT DOCUMENTS 4,818,648 4/1989 Ohta et al. .................... 428/156 X

FOREIGN PATENT DOCUMENTS 126594 11/1984 European Pat. Off. .
228814 7/1987 European Pat. Off. .
2608589 6/1988 France .

OTHER PUBLICATIONS

L. L. Hench et al, "Physical Chemistry of Glass Surfaces", Journal of Non-Crystalline Solids, vol. 28, 1978, pp. 83–105.

Primary Examiner—Cynthia Hamilton
Attorney, Agent, or Firm—Michael N. Meller

[57] ABSTRACT

An information recording disk for recording an information signal along a track defined by a depression on the disk as a change of physical property of a recording material deposited on the track comprises a disk-shaped glass substrate made of a glass and carries a groove corresponding to the track. The groove has a surface roughness substantially smaller as compared to the surface roughness caused at a bottom surface of a groove on a silica glass substrate when both the disk-shaped glass substrate and silica glass substrate are dry-etched under same conditions. The disk-shaped glass substrate comprises $SiO_2$ component and one or both of $Al_2O_3$ and BaO components with substantially no alkali components. Further, a recording layer comprised of the recording material which changes in physical property responsive to a projected energy beam is deposited on the substrate such that the depression is formed in correspondence with the track.

20 Claims, 1 Drawing Sheet

INFORMATION RECORDING MEDIUM HAVING A GLASS SUBSTRATE

BACKGROUND OF THE INVENTION

The present invention generally relates to information signal recording media and in particular to a disk-shaped information recording medium on which an information signal is recorded by means of an energy beam such as a laser beam (optical beam) or an electron beam.

Optical information recording medium such as an optical disk or a magneto-optical disk hereinafter referred to as a disk is recorded with an information signal such as a video signal or an audio signal modulating an optical beam which moves along a spiral or concentric guide groove provided on the surface of the disk. At the time of reproduction, the guide groove is irradiated by an optical beam and the information signal is reproduced by processing the optical beam reflected back from the guide groove. For this purpose, tracking of the the optical beam must be controlled such that the optical beam traces the guide groove properly. Such a tracking of the optical beam is achieved by means of a known servo control system which controls the optical beam on the basis of the optical beam reflected back from the guide groove. The same tracking principle is known to be applicable to recording the information along a preformed guide track. Thus, the guide groove is used not only for storage of information signals but also for maintaining a proper tracking of the optical beam at the time of recording and reproducing of the information signal on and from the disk. The guide groove is usually a spiral-shaped or concentric continuous groove but may be a series of intermittent pits as in the case of a reproducing only type optical disk such as a so-called Compact Disk.

The information recording medium having the guide groove or pits as aforementioned is manufactured by impressing a pattern on a metal stamper which is an inversion of the pattern of the groove or pits to be formed on the surface of the disk. The disk may be formed by injection molding or compression molding of a thermoplastic resin using the metal stamper as the mold. The manufacture of the disk by the injection molding or compression molding has a high productivity and is suited for automatic production. On the other hand, the disk thus produced has a problem in that the impression of the guide groove or pits by the stamper is not satisfactorily precise. Further, the disk tends to show birefringence, and the disk is deformed by the moisture in the air. Thus, these problems of the conventional plastic disk will create difficulties at the time of recording and reproducing.

In order to eliminate these problems, use of silica glass for the substrate of the disk is proposed. The use of silica glass as the substrate of the disk is advantageous in that the disk thus produced has a small thermal expansion and shows virtually no absorption of moisture. Further such a disk has negligible birefringence. In order to provide the guide groove or pits on the surface of such silica glass disk, a layer of UV-cure resin which is a resin cured by ultraviolet radiation is deposited on the surface of the glass. In detail, a layer of UV-cure resin is first applied to the surface of the stamper in an uncured state and the resin is covered by the silica glass disk so as to be sandwitched between them. Next, an ultraviolet light is irradiated on to the resin through the glass disk and the resin is cured. The stamper is then removed and a two layered disk comprising a glass substrate and a layer of the cured resin carrying the pattern of groove or pits thereon is obtained. The disk thus produced is superior as compared with the plastic disk of thermoplastic resin in that a resin having a low viscosity at room temperature can be used and the groove or pits on the stamper is transferred to the plastic layer more accurately as compared to the case of the conventional disk molded from the usual thermoplastic resin. However, this procedure involves delicate steps of sandwitching uncured resin layer as well as of the separation of the stamper from the cured resin layer which pauses difficulties in automatization of its manufacture.

The disk produced by molding of the thermoplastic resin or by application of the UV-cure resin on the silica glass substrate is further deposited with a reflection layer by vacuum vapor deposition or by sputtering. During such procedure, there is a problem that water is released from the cured resin or molded plastic due to the heating and the structure and property of the reflection layer become deteriorated.

In order to eliminate this problem, provision of the guide groove or pits directly etched on the surface of the silica glass substrate is proposed in the U.S. Pat. No. 4,655,876 as well as in the Japanese Laid-open Patent Application No. 26951/1986 in which the respective assignee and the applicant are same as the assignee of the present application. According to the procedure proposed by the aforementioned patent and patent application, a layer of photoresist is applied on a polished surface of a silica glass substrate. Then, the pattern of guide groove or pit is written on this photoresist by means of a focused laser beam. Then, after a development of the laser exposed photoresist, the substrate is subjected to a dry etching such as a plasma etching using a plasma gas such as $CF_4$. The plasma gas selectively reacts with the silica of the glass and the silica material at the portion of the disk not covered with the photoresist is removed by the reaction. On the other hand, the portion of the silica masked by the photoresist is not subjected to the reaction. The reaction is continued until an intended groove depth is reached. After the groove reaches the intended depth, the plasma gas is changed to a gas containing oxygen ($O_2$) and the remaining photoresist is removed by reaction with the oxygen.

However, the disk thus produced shows an unsatisfactory signal-to-noise ratio when the recording and reproduction is made after deposition of recording layer and protection layer on the disk. More specifically, error in the reproduced signal as well as the tracking error of the optical beam were found to be excessive for a satisfactory recording and reproducing operation of the disk. The reason for this was studied by electron microscopic observation of the disk and it was discovered that deterioration in the S/N ratio is caused by the irregularity or roughness at bottom of the groove. Such irregularity produces an unstable reflection of the optical beam. When the surface roughness exceeds about 100 Å, the reflected optical beam becomes too unstable for satisfactory operation of the recording and reproducing system and the proper reproduction of the information signal or proper tracking of the optical beam is lost. At present, it is impossible to etch silica glass without causing irregularity at the bottom of the groove.

Thus, it is not possible to obtain disk to provide satisfactory recording and reproducing results.

SUMMARY OF THE INVENTION

Accordingly, it is a general object of the present invention to provide an information recording medium and a manufacturing method thereof wherein the aforementioned problems are eliminated.

Another object of the present invention is to provide an information recording medium having a depression on its surface for recording an information signal wherein the roughness at the bottom of the depression is minimized so that the signal-to-noise ratio of a reproduced signal reproduced from the recording medium is improved.

Another object of the present invention is to provide a method of forming a depression on a surface of a recording medium comprised of a glass material by etching, wherein the roughness at the surface of the depression is substantially minimized so that the signal-to-noise ratio of a reproduced signal reproduced from the recording medium is improved.

Another object of the present invention is to provide an information recording medium having a depression on its surface for recording an information signal wherein the recording medium comprises a glass substrate of a barium borosilicate glass containing alumina and barium oxide but free from alkalis and alkali earth elements and having an etching rate which is less than sixty percent as compared to the etching rate of the silica glass. According to the present invention, the roughness at the bottom of the depression is successfully reduced as a result of slow etching rate and the signal-to-noise ratio of the reproduced signal is substantially improved. Further, the recording medium of the present invention has a substantially negligible birefringence, virtually absorbs no water, and can be easily manufactured.

DETAILED DESCRIPTION

Figure 2:
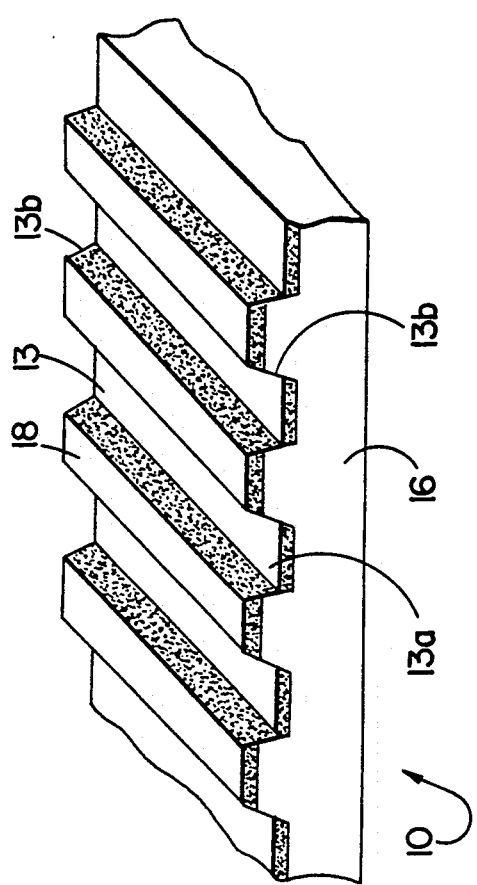
FIG. 2 is a perspective view showing a second embodiment of the recording medium of the present invention.

The present invention is based on a series of experiments exploring the relation between the etching rate and surface roughness at the bottom of a depression or groove formed as a result of etching. The experiments were conducted for various types of glasses as is summarized in Table 1 and a depression or groove having a width of about 2 μm and a depth of about 0.1-0.5 μm in correspondence with the actual depth of the groove of the disk is formed in a spiral formation on the surface of the glass by the plasma etching technique. For a convenience of observation, the width of the groove (about 2 μm) is chosen to be slightly larger than the usual width (0.5-0.8 μm) of the groove formed on the actual disk so that one can measure the depth of the groove precisely by a probe. Each of the glasses were polished so that the surface roughness becomes less than 30 Å before the start of the experiments. The plasma etching was achieved under a total pressure of $2.0 \times 10^{-2}$ Torr using $CF_4$ as the plasma gas and a high frequency power (RF power) of 200 watts is supplied in order to establish the plasma.

Referring to Table I, the type II silica glass is a silica glass containing OH radical amounting to about 150-400 ppm and the type III silica glass is a silica glass containing OH radical amounting to up to 1000 ppm. The type II and type III silica glasses are commercially available glasses under the trade name of Heralux and Suprasil, respectively. The chemical composition of the glasses used in the experiments is listed in Table I. As usual, the chemical composition is represented in percent by weight of the respective components in the form of oxide.

TABLE I

| sample i.d. | Heralux* | Suprasil* | #7740 | plate glass | #0317 | #7059 |
|---|---|---|---|---|---|---|
| Type of glass | Type II silica glass | Type III silica glass | borosilicate glass | soda-lime glass | soda-alumino silicate | barium borosilicate |
| etching rate (Å/min) | 470 | 360 | 380 | 83 | 93 | 107 |
| surface*** roughness | X | X | X | O | O | O |
| $SiO_2$ | 100 | 100 | 81 | 71 | 61 | 49 |
| $Na_2O$ | | | 4 | 15 | 13 | |
| $K_2O$ | | | | | 3 | |
| MgO | | | | 4 | 4 | |
| CaO | | | | 7 | | |
| $Al_2O_3$ | | | 2 | 2 | 17 | 10 |
| $B_2O_3$ | | | 13 | | | 15 |
| BaO | | | | | | 25 |

*trade name
***surface roughness
X: unacceptable (>100 Å)
O: substantially less than 100 Å

From Table I, it can be seen that the type II silica glass, type III silica glass and the borosilicate glass (#7740) having large etching rates show rough surfaces having a surface roughness exceeding 100 Å while the soda lime glass (plate glass commonly used as a panel), soda aluminosilicate glass (#0317) and the barium borosilicate glass (#7059) having small etching rates show smooth surfaces having a surface roughness substantially less than 100 Å. Thus, the etching rate and the surface roughness are proportional to each other and as the etching rate increases, the surface roughness increases. From Table I, it can be seen that the glass samples which showed acceptable surface roughness were etched with an etching rate of 83 Å/min (plate glass), 93 Å/min (#0317) and 107 Å/min (#7059). These etching rates are substantially smaller than the etching rate for the silica glass samples and it can be safely concluded that an acceptable surface roughness is obtained when the etching rate is substantially less than 60% of the etching rate of the silica glass.

From the Table I, it can be seen also that the etching rate is increased with increased content of $SiO_2$ and $B_2O_3$ component and is decreased with increased content of $Na_2O$, $K_2O$, MgO, CaO, $Al_2O_3$ and BaO components. Generally, a satisfactory surface roughness is obtained when the content of the $Na_2O$, $K_2O$, MgO, CaO, $Al_2O_3$ and BaO components exceed about 10% in weight individually or in combination.

The following Table II indicates the temperatures at which the vapor pressure equals 10 Torr for various fluoride species. These fluorides are formed as a result of reaction between the plasma gas and the oxide components in the glass. Thus, the $SiO_2$ component in the glass reacts with the CF$_4$ plasma gas to form the SiF$_4$ component. Similarly, the Na$_2$O, K$_2$O, Al$_2$O$_3$ and B$_2$O$_3$ components in the glass form the NaF, KF, AlF$_3$ and BF$_3$ components in the plasma gas as the product of reaction. The temperatures listed in Table II characterize the thermodynamic properties of the components in the glass and can be regarded as a characteristic temperature characterizing the thermodynamic properties. It is noted that the SiO$_2$ and B$_2$O$_3$ components have relatively low characteristic temperatures while the Na$_2$O, K$_2$O and Al$_2$O$_3$ have relatively high characteristic temperatures.

TABLE II

| Temperature at which the vapor pressure of the fluoride component reaches 10 Torr | |
|---|---|
| Fluoride | Temperature |
| SiF$_4$ | −130.4 |
| NaF | 1240 |
| KF | 1039 |
| AlF$_3$ | 1324 |
| BF$_3$ | −141.3 |

The low characteristic temperature indicates that the corresponding oxide component in the glass reacts fast with the plasma gas and the etching rate is high. On the other hand, the high characteristic temperature indicates that the corresponding oxide component in the glass reacts slow with the plasma gas and the etching rate is decreased. Thus, the observation in Table I that the increase in the SiO$_2$ and B$_2$O$_3$ components in the glass increases the etching rate and the increase in the Na$_2$O, K$_2$O, MgO, CaO, Al$_2$O$_3$ and BaO components decreases the etching rate is supported by thermodynamic consideration. In the sample #7059, the B$_2$O$_3$ component is comparable to that of the sample #7740, however, the effect of the B$_2$O$_3$ component in the sample #7059 is considered to be masked by the existence of the Al$_2$O$_3$ and BaO components and further by the decrease of the SiO$_2$ component.

In the experiments described heretofore, the soda lime glass and the soda aluminosilicate glass which are the glasses commonly used for general purpose also falls in the preferable range as far as the etching rate and surface roughness are concerned. However, such glasses contain alkalis such as Na$_2$O and K$_2$O as well as the alkali earth elements such as MgO and CaO which tend to cause corrosion or pinholes in the recording layer of the optical and magneto-optical disk. Thus, these glasses are not eligible for the substrate of the disk. In other words, the glass material to be used for the substrate of the optical and magneto-optical disks should not only show the etching rate less than 60% of the etching rate of the silica glass but should also be free from alkali which include one or more elements selected from the group consisting of sodium, magnesium, potassium, and calcium. In the optical disk of the present invention to be described, the barium borosilicate glass containing alumina and barium oxide (#7059) is used for the substrate of the disk. This glass contains the Al$_2$O$_3$ and BaO components in more than 10 and 25 percent by weight respectively. Note that the total content of Na$_2$O, K$_2$O, MgO and CaO in sample No. 7059 is less than about 1 wt. % as shown in Table I.

As the Na$_2$O, K$_2$O, MgO and CaO components are undesirable in the constituent of the glass because of the corrosion and pinhole formation as previously described, the glass to be used for the substrate of the disk should be the one containing Al$_2$O$_3$ and BaO components amounting to more than 10 percent by weight individually or in combination. At the same time, such glass should show an etching rate which is less than 60% of the etching rate of the silica glass.

Next, manufacturing of the disk will be described with reference to FIGS. 1(A)–(G) which show a series of manufacturing steps of a disk 10 which is illustrated in the completed form in FIG. 1(G). In the present embodiment, the disk 10 is an erasable optical disk having a TeOx recording layer which changes the reflectivity responsive to the recording made by irradiation of the optical beam. However, the present invention is by no means limited to this particular type of the disk but may be applicable to other optical and magneto-optical type disks in general.

Figure 1A:
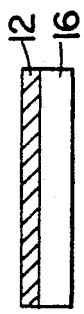
FIGS. 1(A)-(G) are schematic illustrations showing a first embodiment of the recording medium of the present invention as well as the steps for manufacturing the recording medium.
Figure 1B:
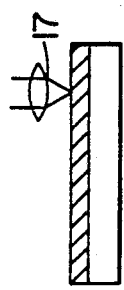
Figure 1C:
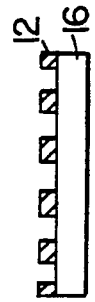
Figure 1D:
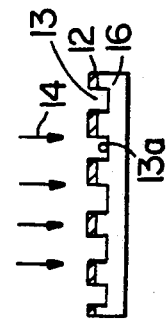
Figure 1E:
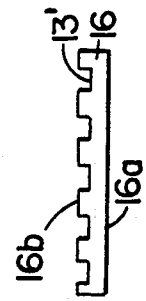
Figure 1F:
Figure 1G:
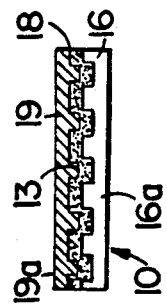

Referring to FIG. 1(G), the optical disk 10 comprises a disk-shaped substrate 16 bounded by a flat bottom 16a, a TeOx recording layer 18 deposited on a surface 16b of the substrate 16 and a protection layer 19 formed on the recording layer 18. The protection layer 19 may be transparent or may be opaque and may be bounded by a flat surface 19a or may be bounded by a surface 19a which is not substantially flat. The substrate 16 is made of the #7059 glass in Table I which is transparent to an energy beam used for recording and reproducing the information signal on and from the recording layer 18 and having the etching rate less than 60% of the etching rate of silica glass. The substrate 16 is formed with grooves 13 having a concentric or spiral-shaped pattern on its surface 16b and the surface 16b of the substrate is covered by a recording layer 18 of TeOx. TeOx is a non-stoichiometric compound of Te and TeO$_2$ and causes a phase transition responsive to the heating by a relatively intense optical beam. Responsive to the phase transition, the reflectivity of the TeOx layer 18 is changed and the recording of information signal is achieved as a change in the reflectivity of the recording layer 18. The recorded information is erased by annealing the TeOx layer 18 by a relatively low energy optical beam. TeOx may be doped with Ge and Sn. The principle of the erasable recording system using TeOx as the recording medium is well known and no further description will be given. The guide groove has a width of less than 1 μm corresponding to the beam spot of the optical beam used for the recording and reproducing of the information signal as is usual in the art. Similarly, the depth of the groove is less than 0.1 μm as is usual.

Referring to FIG. 1(A), the substrate 16 is first applied with a photoresist 12 with a uniform thickness. The photoresist 12 may be any photoresist commonly used in the patterning of semiconductor chips. Then, a focused laser beam 17 is irradiated on the surface of the photoresist continuously while revolving the substrate 16 and the photoresist 12 unitarily around a central axis of the substrate as shown in FIG. 1(B). At the same time, the laser beam 17 is scanned on the surface of the photoresist 12 and a spiral-shaped pattern is drawn on the surface of the photoresist 12 by the laser beam. The spot of the laser beam on the surface of the photoresist, the seed of revolution of the substrate 16, and the speed of scanning of the laser beam are chosen such that a predetermined spiral pattern is written with a predetermined thickness. If the laser beam is intensity-modulated, a series of pits will be recorded accordingly along the predetermined spiral pattern.

Next, the photoresist 12 is developed as shown in FIG. 1(C) wherein a portion of the photoresist 12 irradiated with the laser beam is removed. In other words, the portion of the substrate corresponding to the portion of the photoresist irradiated with the laser beam 17 is exposed.

The substrate 16 having a reminder of the developed photoresist is then brought into a reaction chamber of a plasma etching apparatus (not shown). The reaction chamber is supplied with a $CF_4$ gas and the exposed portion of substrate is subjected to dry etching in a plasma 14 of $CF_4$ shown in FIG. 1(D). During this plasma etching, the etching rate is controlled so that the etching rate is less than 60% of the etching rate of the silica glass and a spiral groove 13' is formed. The groove 13' corresponds to the guide groove 13 of the disk. The groove 13' thus formed has a bottom surface 13a which is sufficiently smooth and the surface roughness of the surface 13a is limited to substantially below 100 Å. The etching is continued until the groove 13' reaches a predetermined depth as shown in FIG. 1(D). The plasma etching apparatus is well known apparatus commonly used in the manufacturing of the semiconductor integrated circuit chips and the description thereof will be omitted.

Next, the gas supplied to the reaction chamber is changed from the $CF_4$ gas to an $O_2$ and the remaining photoresist 12 is removed by reaction with the plasma gas now containing $O_2$. This procedure is called ashing. As a result, the substrate 16 is formed with the groove 13' is obtained as shown in FIG. 1(E).

The substrate 16 thus obtained is then deposited with a layer 18 of TeOx compound by sputtering as shown in FIG. 18(F). The thickness of the layer 18 is usually about 0.1 μm and the guide groove 13 is formed on a surface of the layer 18. Then the protection layer 19 is applied on the layer 18 by applying a resin such as the UV-cured resin or by depositing $SiO_2$, $Si_3N_4$, SiC or C on the surface of the layer 18 by sputtering or vacuum evaporation. Thus, the disk 10 as shown in FIG. 1(G) is obtained. When the protection layer 19 is formed by the resin, the surface 19a may be generally flat. On the other hand, when the protection layer 19 is provided by sputtering or vacuum evaporation, the surface 19a is formed with a pattern corresponding to the groove 13 on the recording layer. Because the reduced surface roughness at the bottom of the guide groove at which the incident optical beam is reflected, the S/N ratio in the optical beam reflected back from the guide groove of such disk is improved and the recording and reproduction of the information signal on and from the disk is performed satisfactorily.

Further, the disk 10 thus obtained is subjected to an environmental test for reliability. The disk 10 is held at a temperature of 60° C. and relative humidity of 90% for a period exceeding 1000 hours. In this test, no appearance of corrosion or pinholes was observed. Thus, the disk of the present invention can be stored without problem for a prolonged period of time.

Although the manufacturing of the disk 10 used the laser beam 17 for writing the pattern of the guide groove 13 on the photoresist 12, the patterning of the guide groove 13 on the photoresist 12 may be achieved by irradiation of ultraviolet light using a photomask formed with a pattern of the guide groove, 13, or by using an electron beam projected on the layer of photoresist in the vacuum chamber.

Further, the gas used for the plasma etching is not limited to the $CF_4$ gas but may be any gas containing fluoride vapor such as $CHF_3$ as far as they react with the glass. For example, the plasma gas may contain $C_2F_6$, $C_3F_8$, $NF_3$ and a mixture thereof.

FIG. 2 shows a second embodiment of the disk of the present invention. In the drawing, those portions corresponding to the portion already illustrated in FIGS. 1(A)–(G) are given identical reference numerals and the description thereof will be omitted. In order to facilitate the understanding of the drawing, the protection layer 19 is not illustrated in FIG. 2. Referring to the drawing, the guide groove 13 is defined by a pair of tapered portion 13b which extends along the groove 13 at the both sides which also subject the reflection of the optical beam, thus the tracking of the optical beam is improved. Such a tapered portion may be formed according to a method disclosed in the aforementioned U.S. Pat. No. 4,655,876.

Further, the guide groove is not limited to the spiral groove but may be a plurality of concentric formation.

Further, the present invention in not limited to the embodiment described heretofore, but various variations and modification may be made without departing from the scope of the invention.

What is claimed is:

1. An information recording disk for recording an information signal along a track defined by a depression on the disk as a change of physical property of a recording material deposited on the track comprising:
   a disk-shaped glass substrate made of a glass defined by a flat first surface at a first side and a second surface carrying a groove corresponding to the track at a second side opposite to the first side, said groove being defined by a bottom surface having a surface roughness substantially smaller as compared to the surface roughness caused at a bottom surface of a groove on a silica glass substrate when both the disk-shaped glass substrate and silica glass substrate are dry-etched under same conditions, and said disk-shaped glass substrate comprising $SiO_2$ component and one or both of $Al_2O_3$ and BaO components while free from those alkali and alkali earth elements having one or more elements selected from a group consisting of sodium, magnesium, potassium, and calcium;
   a recording layer comprised of the recording material which changes in physical property responsive to a projected energy beam modulated with the information signal, said recording layer deposited on the second surface of the substrate having one side thereof making an intimate contact with the second surface, said recording layer carrying said depression which defines the track on other side of the recording layer; and
   a protection layer deposited on said another side of the recording layer so that the depression on the recording layer is buried under the protection layer with an intimate contact between the protection layer and the recording layer.

2. An information recording disk as claimed in claim 1 in which the surface roughness at the bottom surface of the groove is substantially smaller than 100 Å.

3. An information recording disk as claimed in claim 1 in which the disk-shaped glass substrate comprises a glass which shows an etching rate substantially smaller than 60% of the etching rate of silica glass when both the glass and the silica glass are dry etched under same conditions.

4. An information recording disk as claimed in claim 1 in which at least one of the $Al_2O_3$ and BaO components int he glass is contained by an amount equal to or larger than 10% by weight.

5. An information recording disk as claimed in claim 1 in which the $Al_2O_3$ component is contained in the glass by an amount equal to or larger than 10 percent by weight.

6. An information recording disk as claimed in claim 1 in which the BaO component is contained in the glass by an amount equal to or larger than 10 percent by weight.

7. An information recording disk as claimed in claim 1 in which the BaO component is contained in the glass by an amount equal to or larger than 25 percent by weight.

8. An information recording disk as claimed in claim 1 in which the $Al_2O_3$ and BaO components are contained in the glass by an amount such that the total content of the $Al_2O_3$ and BaO components are contained in the glass by an amount such that the total content of the $Al_2O_3$ and BaO components is equal to or larger than 10 percent by weight.

9. An information recording disk as claimed in claim 1 in which the depression on said another side of the recording layer is a groove which is defined at both sides thereof by a pair of declined surfaces extending along the depression.

10. An information recording disk as claimed in claim 1 in which the recording layer is a layer of TeOx compound.

11. A method of manufacturing an information recording disk for recording an information signal along a track defined by a depression as a change of physical property of a recording material deposited on the depression comprising steps of:

applying a photoresist on a surface of a disk-shaped glass substrate made of a glass free from those alkali and alkali earth elements having one or more elements selected from a group consisting of sodium, magnesium, potassium, and calcium;

exposing the photoresist to a radiation of energy beam so as to write a pattern on the photoresist by the radiation, developing the photoresist and removing a portion of the photoresist irradiated by the radiation from the surface of the glass substrate;

subjecting the glass substrate to an etching at an etching rate substantially slower than an etching rate which is obtained when a silica glass is etched under a same etching condition and forming a groove deep into the glass substrate at a portion of the surface of the glass substrate which is not covered by the photoresist after the etching, said groove formed by the dry etching being corresponding with the depressions defining said track removing a remaining photoresist from the surface of the glass substrate;

depositing the recording material, physical property thereof is transformable responsive to further radiation of energy beam modulated with the information signal, on the surface of the glass substrate to form a recording layer such that the depression which defines the track is formed on a surface of the recording layer in correspondence with the groove at the surface of the glass substrate; and depositing a protection layer on the surface of the recording layer for protecting the depression at the surface of the recording layer.

12. A method of manufacturing an information recording disk as claimed in claim 11 in which said step of etching comprises a dry etching of the glass at an etching rate substantially slower than 60 percent of the etching rate which is obtained when the silica glass is etched under the same etching condition.

13. A method of manufacturing an information recording disk as claimed in claim 11 in which the glass substrate is a glass comprising $SiO_2$ component and one or both of $Al_2O_3$ and BaO components such that at least one of the $Al_2O_3$ and BaO components is contained by an amount equal to or larger than 10% by weight.

14. A method of manufacturing an information recording disk as claimed in claim 11 in which the glass substrate is a glass comprising $SiO_2$ component and $Al_2O_3$ and BaO components such that the total amount of the $Al_2O_3$ and BaO components in the glass is equal to or larger than 10% by weight.

15. A method of manufacturing an information recording disk as claimed in claim 11 in which the step of exposing the photoresist to radiation is performed by a laser beam.

16. A method of manufacturing an information recording disk as claimed in claim 11 in which the step of exposing the photoresist to radiation is performed by using a photomask carrying a pattern corresponding to the groove to be formed on the glass substrate.

17. A method of manufacturing an information recording disk as claimed in claim 12 in which the step of etching comprises plasma etching of the glass substrate using a plasma gas containing one or more fluoride species selected from a group of $CF_4$, $CHF_3$, $C_2F_6$, $C_3F_8$ and $NF_3$.

18. A method of manufacturing an information recording disk as claimed in claim 12 in which the etching rate of the glass substrate is chosen substantially smaller than 360 Å/min.

19. A method of manufacturing an information recording disk as claimed in claim 12 in which the etching rate of the glass substrate is chosen smaller than 107 Å/min.

20. An information recording disk as claimed in claim 1 in which said glass substrate is free of sodium and potassium.

* * * * *